3,435,624
DUAL TEMPERATURE COLD TRAP
John D. Rockenfeller, Glastonbury, Conn., assignor to United Aircraft Corporation, East Hartford, Conn., a corporation of Delaware
Filed Oct. 31, 1967, Ser. No. 679,307
Int. Cl. B01d 5/00, 53/10
U.S. Cl. 62—55.5                                 4 Claims

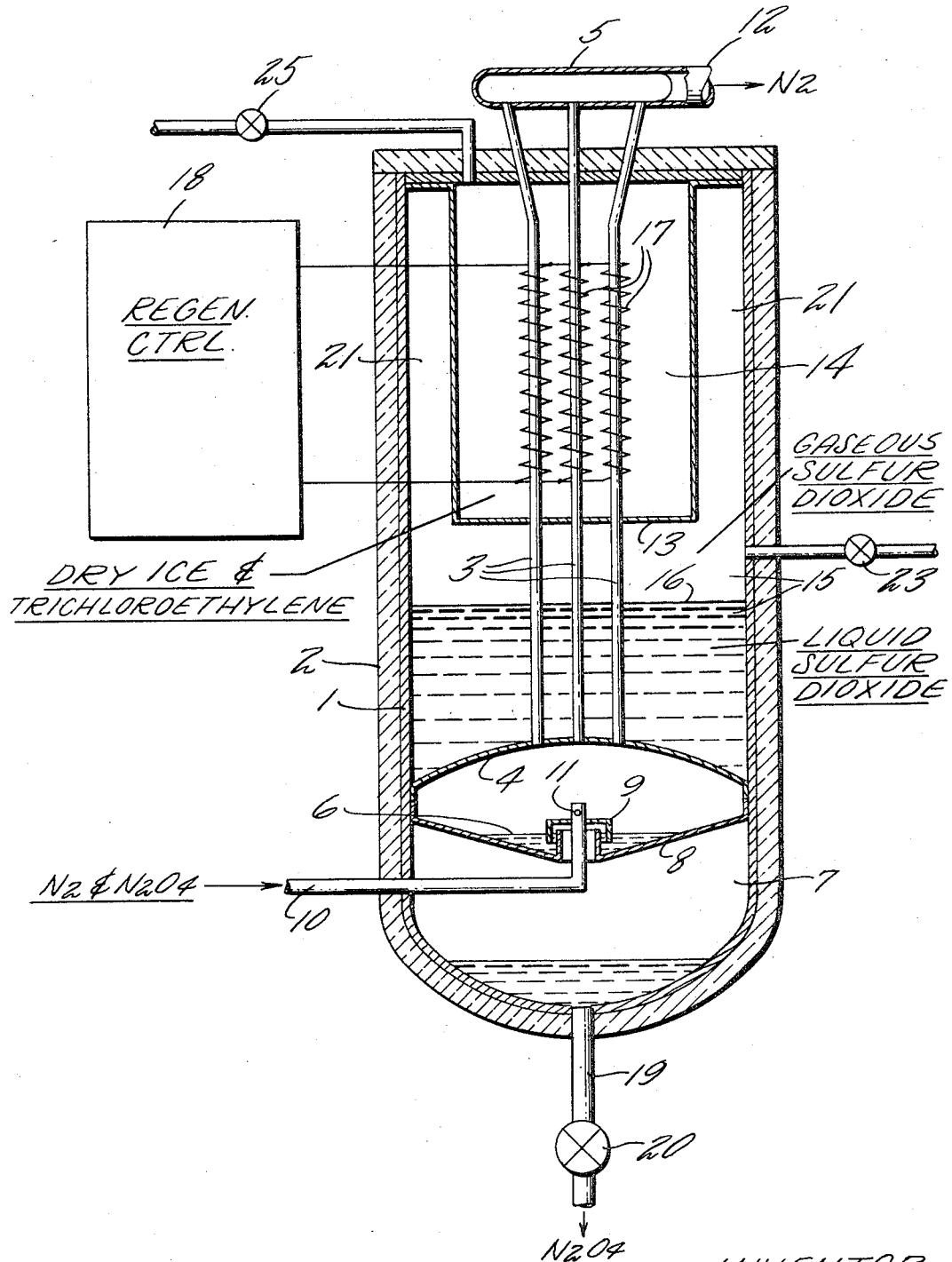

ABSTRACT OF THE DISCLOSURE

A single primary coolant is used both to solidify remnants of a gaseous impurity in a gaseous flow as well as to condense a secondary coolant which is used to liquify said impurities prior to passage through the solidifying portion of the system. With gravity return of condensed secondary coolant, no compressors or pumps are needed.

BACKGROUND OF THE INVENTION

*Field of invention.*—This invention relates to cold traps, and more particularly to dual cold traps having a single expendable primary coolant and no pumps or compressors.

*Description of the prior art.*—The use of a dual temperature cold trap in which substantial portions of a gaseous impurity in a gas flow are liquified, following which remaining traces of the impurity are frozen out of the gas flow is well known. However, prior devices either require multiple expendable coolants (such as liquified gas) or use a closed-cycle refrigeration system employing compressors and/or pumps. Additionally, many such devices freeze a sufficient amount of impurity so as to clog the device at a high rate and therefore require a push-pull system to permit frequent melting cycles at which the impurity is raised to a liquid temperature so that it can flow away, thus regenerating the system.

SUMMARY OF INVENTION

The object of the present invention is to provide a simplified dual cold trap for removing a gaseous contaminant from a gaseous flow.

In accordance with the present invention, a cold trap includes heat exchange passages passing through a primary and a secondary coolant chamber, the primary coolant chamber being located within the secondary coolant chamber, the primary coolant chamber being in fluid communication with the gaseous passages downstream of the secondary coolant area. The secondary coolant therefore cools the gases to a temperature sufficient to liquify an impurity, the gases then passing through the primary coolant to solidify the remainder of the impurity; heat released to the secondary coolant during the liquification of the contaminant causes vaporization of the secondary coolant, which in turn is condensed on the walls of the primary coolant tank and is gravity returned for use as secondary coolant.

The foregoing and other objects, features and advantages of the present invention will become more apparent in the light of the following detailed description of preferred embodiments thereof as illustrated in the accompanying drawing.

BRIEF DESCRIPTION OF THE DRAWING

The sole figure herein comprises a semipictorial sectioned elevation of a dual temperature cold trap in accordance with the present invention.

DESCRIPTION OF THE PREFERRED EMBODIMENT

A tank 1, covered with insulation 2 is vertically oriented (as shown in the figure). The tank 1 is provided with a plurality of gaseous passages 3 which join a chamber wall 4 at the bottom and are brought together in a manifold 5 at the top. The tank 1 and chamber wall 4 provide two compartments 6, 7 separated by a baffle 8 which includes a deflector 9. An inlet pipe 10 is provided for the entrance of contaminated gas, such nitrogen and nitrogen tetroxide, the gas flowing upwardly in the pipe 10 to a hole 11 where it emerges into the compartment 6. The flow of gas then is upwardly through the passages 3 to the manifold 5 and through an outlet pipe 12.

A primary coolant chamber is provided by walls 13, which completely surround the passages 3. Within this chamber may be placed a primary coolant 14, such as a mixture of Dry Ice and trichloroethylene. Between the tank 1, the chamber wall 4, and chamber walls 13, is a secondary coolant chamber 15. Within this chamber the secondary coolant may exist in both the liquid and gaseous phases, the liquid settling to the bottom of the tank (such as below the dashed line 16 in the figure) and the gaseous coolant being above the dashed line 16.

A plurality of electrical heating coils 17 may be provided around the passages 3 within the area 14 of the primary coolant. These coils may be connected to a regeneration control 18 so that, periodically, passages 3 may be heated up to a temperature sufficient to liquify the frozen contaminant which collects therein, the contaminant thereby flowing downwardly through the passages 3 into the compartment 6 through the baffle 8 and into the liquid storage compartment 7 where liquid contaminant may be stored. From time to time, liquid contaminant may be drawn off from the storage compartment 7 through an outlet pipe 19 by opening a valve 20.

In operation, the gas containing gaseous contaminant enters the campartment 6 through the hole 11 in the inlet pipe 10. This gas flows upwardly to the passages 3, and these passages are cooled to the nominal liquid temperature of a secondary coolant. In the example being used herein, the secondary coolant may comprise liquid sulfur dioxide, which is at a temperature of about −10° C. As the gas stream passes through the lower ends of the passages 3, heat removed therefrom causes vaporization of some of the primary coolant in the chamber 15, and this vaporized coolant will then rise into the area 21 immediately adjacent the primary coolant tank 13. The primary coolant may comprise a slurry of Dry Ice and trichloroethylene at −78° C. This will therefore cause a condensing of gaseous sulfur dioxide on the walls 13, and the sulfur dioxide will have the heat removed therefrom by the primary coolant 14. This condensate then returns by gravity force to the bottom of the chamber 15. In other words, there is a complete, automatic, unpumped cycling of the secondary coolant which provides liquification of contaminant as the gaseous flow starts up the passage 3.

When the gaseous flow reaches the upper portion of the passage 3 so as to be within the primary coolant 14, the temperature is sufficiently cold so as to freeze the remaining contaminant in the gaseous stream, this contaminant coming out of the stream as a solid. However, the molecular nitrogen does not freeze at −78° C. and therefore can pass on through the manifold 5 and the outlet pipe 12. Periodically, the buildup of frozen nitrogen tetroxide in the upper portions of the passages 3 will require the heating of the passages 3 such as by the electrical heating wire 17, thereby to melt the nitrogen tetroxide so that it will flow downwardly in the passages 3 and into the compartment 6 then through the baffle 8 and into the compartment 8 where it will be drawn off.

Secondary coolant may be introduced into the system through a valve 23, and primary coolant may be introduced to the system through a valve 25.

As described herein, nitrogen tetroxide may be removed using a primary coolant comprising a slurry of Dry Ice and trichloroethylene, together with a secondary coolant of liquid sulfur dioxide. It should be understood, however, that the system is equally applicable to the removal of various gaseous contaminants from various gaseous flows, using different combinations of primary coolant and secondary coolant.

Although the invention has been shown and described with respect to a preferred embodiment thereof, it should be understood by those skilled in the art that the foregoing and other changes and omissions in the form and detail thereof may be made therein without departing from the spirit and scope of the invention.

Having thus described a typical embodiment of the invention, that which I claim as new and desire to secure by Letters Patent of the United States is:

1. A dual temperature cold trap, comprising:
   a chamber adapted to contain a refrigerant capable of existing in the liquid phase at a first temperature and in a gaseous phase at a second temperature;
   a second chamber adapted to contain a coolant at a temperature which is lower than said first temperature, said first chamber being in fluid communication with the exterior of said second chamber, a portion of said first chamber being below the level of a substantial portion of said second chamber;
   and a gaseous flow passage extending through said first chamber and through said second chamber, said gaseous flow passage including a reservoir, said reservoir being oriented with respect to said first and second chambers so as to receive liquified products as a result of liquification of matter in said passage within said first and second chambers.

2. The cold trap according to claim 1 wherein said refrigerant comprises sulfur dioxide, said coolant comprises a slurry of Dry Ice and trichloroethylene, and said gas flow comprises nitrogen with nitrogen tetroxide contaminant.

3. The cold trap according to claim 1 wherein each of said chambers is a closed chamber isolated from fluid communication between each other.

4. A dual temperature cold trap, comprising:
   a refrigerant chamber;
   a coolant chamber, said refrigerant chamber being in fluid communication with the exterior of said coolant chamber, a portion of said refrigerant chamber being below the level of a substantial portion of said coolant chamber;
   and a gaseous flow passage extending through said chambers, said gaseous flow passage including a reservoir, said reservoir being oriented with respect to said chambers so as to receive liquified products as a result of liquification of matter in said passage within said chambers.

References Cited

UNITED STATES PATENTS

| | | | |
|---|---|---|---|
| 3,304,731 | 2/1967 | Bills et al. | 62—55.5 |
| 3,371,499 | 3/1968 | Hagenbach et al. | 62—55.5 |
| 3,390,536 | 7/1968 | Kreisman | 62—55.5 |

LLOYD L. KING, *Primary Examiner.*

U.S. Cl. X.R.

55—268